United States Patent
Madhani et al.

(10) Patent No.: US 9,019,568 B2
(45) Date of Patent: Apr. 28, 2015

(54) ACCURATELY EXTRACTING INFORMATION BASED ON ORTHOGONAL IMAGES

(75) Inventors: Sunil H. Madhani, Bangalore (IN); Sridhar Jagannathan, Los Altos, CA (US)

(73) Assignee: Intuit Inc., Mountain View, CA (US)

( * ) Notice: Subject to any disclaimer, the term of this patent is extended or adjusted under 35 U.S.C. 154(b) by 485 days.

(21) Appl. No.: 13/427,461

(22) Filed: Mar. 22, 2012

(65) Prior Publication Data

US 2013/0250368 A1 Sep. 26, 2013

(51) Int. Cl.
- H04N 1/00 (2006.01)
- H04N 1/21 (2006.01)
- G06Q 40/00 (2012.01)

(52) U.S. Cl.
CPC .............. H04N 1/215 (2013.01); G06Q 40/125 (2013.12); H04N 2201/0436 (2013.01); H04N 2201/3215 (2013.01); H04N 2201/3252 (2013.01)

(58) Field of Classification Search
None
See application file for complete search history.

(56) References Cited

U.S. PATENT DOCUMENTS

| | | | |
|---|---|---|---|
| 8,276,088 B2 | 9/2012 | Ke et al. | |
| 8,284,985 B2 | 10/2012 | Charpentier | |
| 2003/0076539 A1* | 4/2003 | Nakajima | 358/2.1 |
| 2006/0126120 A1* | 6/2006 | Imafuku et al. | 358/1.18 |
| 2006/0262352 A1* | 11/2006 | Hull et al. | 358/1.18 |
| 2006/0285172 A1* | 12/2006 | Hull et al. | 358/448 |
| 2007/0036469 A1* | 2/2007 | Kim et al. | 382/305 |
| 2008/0291497 A1* | 11/2008 | Kuwano et al. | 358/1.18 |
| 2009/0019402 A1 | 1/2009 | Ke et al. | |
| 2009/0175491 A1 | 7/2009 | Charpentier | |
| 2013/0321826 A1* | 12/2013 | Chen et al. | 356/623 |

FOREIGN PATENT DOCUMENTS

JP 2005-228302 8/2005

\* cited by examiner

*Primary Examiner* — Jeremiah Bryar
(74) *Attorney, Agent, or Firm* — Park, Vaughan, Fleming & Dowler LLP; Steven E. Stupp

(57) ABSTRACT

During an information-extraction technique, a user of an electronic device may be instructed by an application executed by the electronic device (such as a software application) to acquire images, with different orientations (which are known to the user), of a target location on a document using an imaging sensor, which is integrated into the electronic device. After the user has taken a first image and before the user takes a second image in a different orientation of the electronic device (and, thus, the imaging sensor), the electronic device captures multiple images of the document. Then, the electronic device stores the images with associated timestamps. Moreover, after the user has taken the second image, the electronic device analyzes one or more of the first image, the second image and at least a subset of the images to extract information proximate to the target location on the document.

23 Claims, 4 Drawing Sheets

ACCURATELY EXTRACTING INFORMATION BASED ON ORTHOGONAL IMAGES

BACKGROUND

The present disclosure relates to techniques for capturing multiple images of a document and accurately extracting information from the images.

The widespread availability of digital cameras and cellular telephones with integrated imaging sensors has led to a significant increase in digital photography and associated software applications that leverage information in the acquired images. For example, after a user captures an image of a document (such as a financial document) using a digital camera or a cellular telephone (which are each sometimes referred to as an 'electronic device'), a software application executing on the electronic device (such as a financial software application) can extract information from the image using optical character recognition. Then, at least in principle, the financial software application can use the extracted information to populate fields in a form or to perform a financial calculation.

However, in practice, the ability to extract useful information from an image (especially for use with a software application) is often restricted by the image quality. For example, depending on the image quality, errors may occur when extracting the information using optical character recognition. These errors can make it more difficult, if not impossible, for a software application (such as the financial software application) to subsequently use the extracted information.

As a consequence, after acquiring an image, the user may need to perform post-acquisition operations, such as: editing the image to crop the area of interest; correcting any errors that occurred in the extracted information; and, if the image is blurry or the area of interest was not captured, repeating the image-capture and/or the post-acquisition operations one or more times. Performing the image-capture and/or the post-acquisition operations once, let alone multiple times, is time-consuming and may consequently limit the willingness of users to acquire images or to use software applications that leverage the information in images.

SUMMARY

The disclosed embodiments relate to an electronic device that extracts information from a document. During operation, the electronic device (or an application executing on the electronic device) provides an instruction to a user to acquire a first image of a target location on the document using an imaging device, which is integrated into the electronic device, when the imaging device is in a first orientation, and to acquire a second image of the target location using the imaging device when the imaging device is in a second orientation. After a first instance in which the user activates an image-activation mechanism, which is associated with the imaging device (such as a physical button or a virtual icon for activating the imaging sensor), and captures the first image, and before a second instance in which the user activates the image-activation mechanism and captures the second image, the electronic device captures multiple images of the document. Then, the electronic device stores the images with associated timestamps. Moreover, the electronic device receives a signal indicating the second instance of the user activating the image-activation mechanism. In response to the signal, the electronic device analyzes one or more of the first image, the second image and at least a subset of the images to extract the information proximate to the target location on the document.

Note that the images may be stored with spatial-position information, which is provided by a sensor which is integrated into the electronic device. For example, the sensor may include one of: an accelerometer and a gyroscope. Therefore, the spatial-position information may include position information and/or orientation information. Furthermore, the images may be captured at an image capture rate that is based on the spatial-position information.

In some embodiments, the electronic device identifies an error in the analysis based on a predefined information format associated with the target location on the document. Moreover, the electronic device may perform error correction of the identified error based on at least the subset of the images. Note that a contribution of a given image during the error correction may be based on a corresponding weight, and the weight may be based on at least one of a difference between: a timestamp associated with the given image and a reference timestamp; spatial-position information associated with the given image and reference spatial-position information; and/or differences between the information extracted from the images.

Furthermore, the multiple images may be captured without the user activating the image-activation mechanism. Additionally, the analysis may include optical character recognition, the document may include a financial document (such as: an invoice, a bill and/or a financial vehicle), and/or the application may include a financial application.

In some embodiments, the electronic device erases the one or more images after performing the analysis.

Note that an angular difference between the first orientation and the second orientation may be approximately 90°.

Another embodiment provides a method that includes at least some of the operations performed by the electronic device.

Another embodiment provides a computer-program product for use with the electronic device. This computer-program product includes instructions for at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an electronic device, a technique for extracting information, and a computer-program product (e.g., software) for use with the electronic device are described. During this information-extraction technique, a user of the electronic device may be instructed by an application executed by the electronic device (such as a software application) to acquire images, with different orientations (which may be known to the user so the user does not have to learn any new terminology), of a target location on a document using an imaging sensor, which is integrated into the electronic device. For example, the user may be instructed to take pictures of a field on an invoice using a cellular-telephone camera. After the user has taken a first image and before the user takes a second image in a different orientation of the electronic device (and, thus, the imaging sensor), the electronic device captures multiple images of the document. Then, the electronic device stores the images with associated timestamps (which may be specified by a system clock). Moreover, after the user has taken the second image, the electronic device analyzes one or more of the first image, the second image and at least a subset of the images to extract the information proximate to the target location on the document.

By facilitating accurate extraction of the information, the information-extraction technique may simplify the use of the imaging sensor, the application and, thus, the electronic device. In the process, the information-extraction technique may significantly improve the user experience when using the application and the electronic device, thereby increasing customer satisfaction, and sales of the application and the electronic device.

In the discussion that follows, a user may include: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
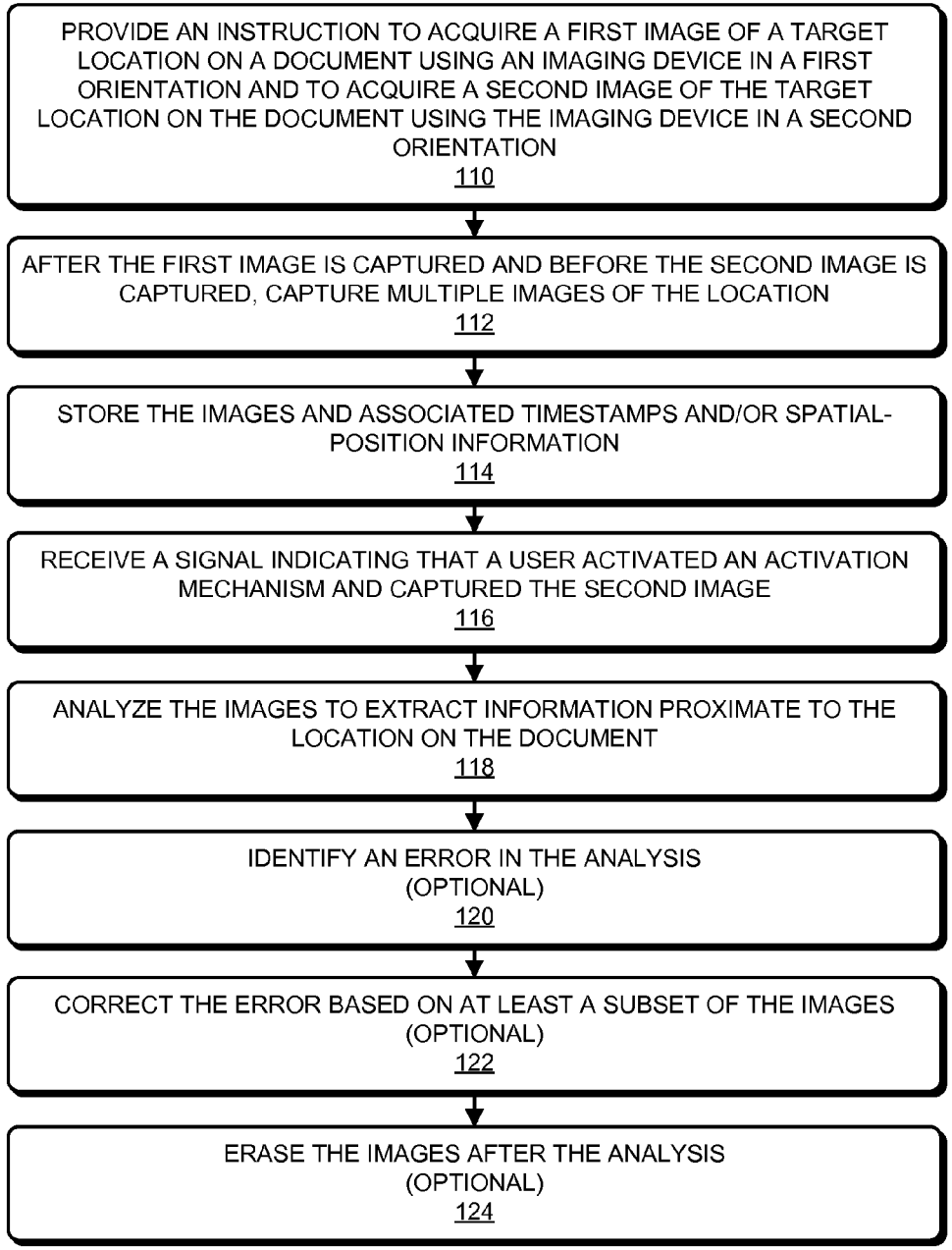
FIG. 1 is a flow chart illustrating a method for extracting information in accordance with an embodiment of the present disclosure.
Figure 3:
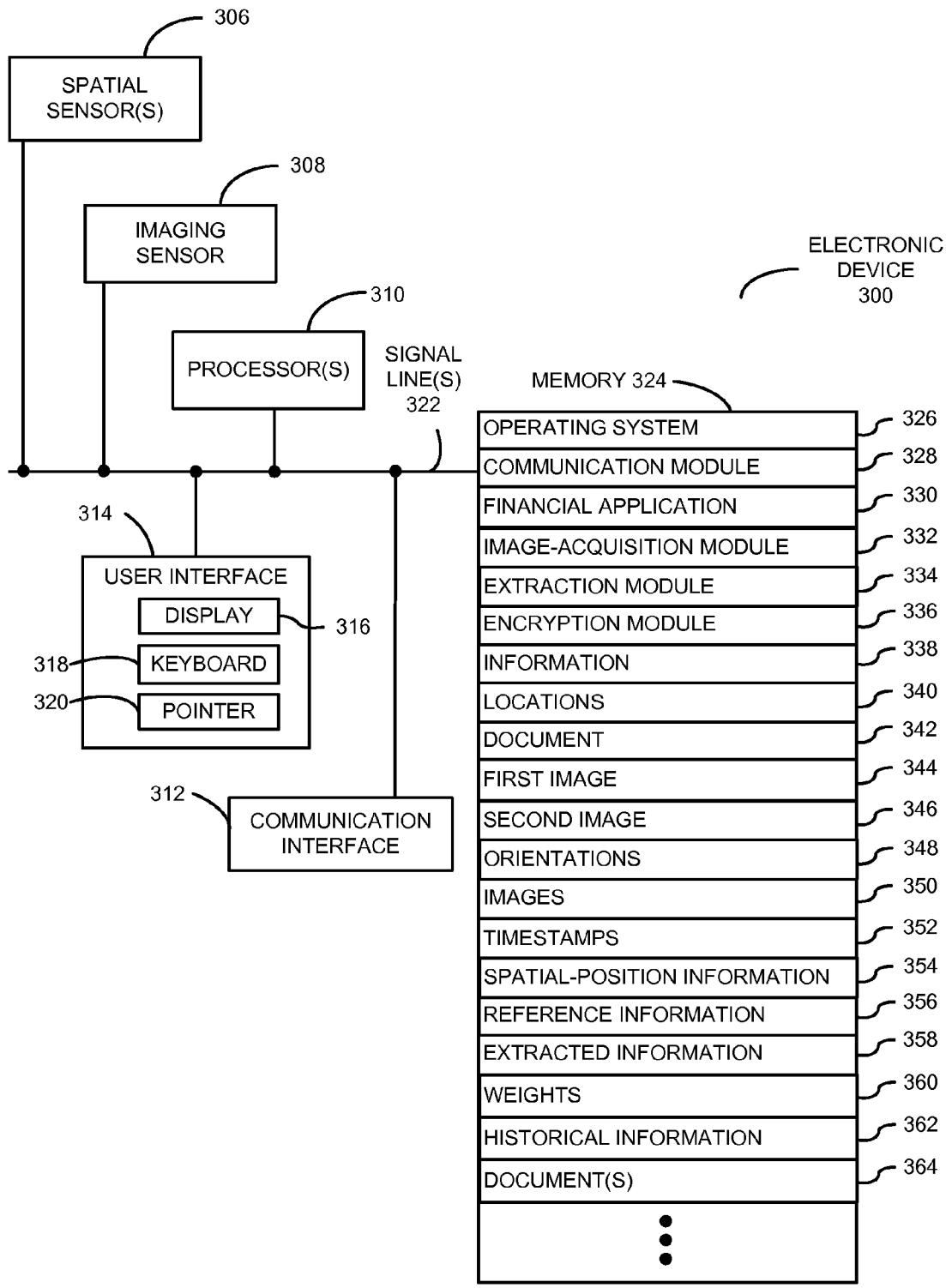
FIG. 3 is a block diagram illustrating an electronic device that performs the method of FIG. 1 in accordance with an embodiment of the present disclosure.

We now describe embodiments of the information-extraction technique, which may be performed by an electronic device (such as electronic device 300 in FIG. 3). FIG. 1 presents a flow chart illustrating a method 100 for extracting information. During operation, the electronic device (or an application executing on the electronic device) provides an instruction to a user to acquire a first image of a target location on a document using an imaging device, which is integrated into the electronic device, when the imaging device is in a first orientation, and to acquire a second image of the target location using the imaging device when the imaging device is in a second orientation (operation 110). For example, the document may include a financial document (such as: an invoice, a paycheck, a bill, a W-2 form and/or a financial vehicle) and/or the application may include a financial application. Therefore, the target location may include a field with: an account number, an amount due, and/or a due date. Note that an angular difference between the first orientation and the second orientation may be approximately 90°. For example, the first orientation may be portrait and the second orientation may be landscape (or vice versa).

After a first instance in which the user activates an image-activation mechanism, which is associated with the imaging device (such as a physical button or a virtual icon for activating the imaging sensor), and captures the first image, and before a second instance in which the user activates the image-activation mechanism and captures the second image, the electronic device captures multiple images of the document (operation 112). These images may be captured without the user activating the image-activation mechanism (thus, the images may be acquired without the user's knowledge).

Then, the electronic device stores the images with associated timestamps (operation 114). For example, the images and the timestamps may be stored in a computer-readable memory. Note that the images may be stored with spatial-position information, which is provided by a sensor which is integrated into the electronic device. For example, the sensor may include one of: an accelerometer and a gyroscope. Therefore, the spatial-position information may include a position and orientation in a coordinate system, such as x, y, and z, and associated angles $\theta$, $\alpha$, $\gamma$, and/or accelerations along one or more axes. Furthermore, the images may be captured at an image capture rate that is based on the spatial-position information. In particular, the image capture rate may be approximately constant when the spatial-position information is varying (i.e., when the point of interest or center of the field of view of the imaging sensor is changing). However, in some embodiments the image capture rate is larger when the spatial-position information is varying rapidly (i.e., when the point of interest or center of the field of view of the imaging sensor is changing), and may be smaller when the spatial-position information is approximately stable. Thus, the image capture rate may be dynamically adjusted.

Note that the spatial-position information may be considered approximately stable when it remains within a predefined range for a predefined time duration, e.g., changes in spatial position of the electronic device are less than 5-10% for 0.5-2 s. Alternatively or additionally, approximate stability may occur when a focus level (or exposure setting) corresponding to a focus of the imaging device is stable, e.g., when the focus level remains within a predefined range for a predefined time duration (such as within 5-10% of accurate focus for 1-2 s).

Subsequently, the electronic device receives a signal indicating the second instance of the user activating the image-activation mechanism (operation 116) (i.e., the user has acquired the second image). In response to the signal, the electronic device analyzes one or more of the first image, the second image and at least a subset of the images to extract the information proximate to the target location on the document (operation 118). For example, the analysis may involve optical character recognition.

In some embodiments, the electronic device optionally identifies an error in the analysis (operation 120), for example, based on a predefined information format associated with the target location on the document. Moreover, the electronic device may optionally perform error correction of the identified error based on at least the subset of the images (operation 122). Note that a contribution of a given image during the error correction may be based on a corresponding weight. As described further below with reference to FIG. 2, the weight may be based on at least one of a difference between: a timestamp associated with the given image and a reference timestamp (such as a reference timestamp when the first image or the second image was acquired); spatial-position information associated with the given image and reference spatial-position information (such as a reference spatial-position information when the first image or the second image was acquired); and/or differences between the information extracted from the images. For example, the weight may be larger when the difference is smaller.

Furthermore, in some embodiments the analysis is optionally based on historical information previously extracted from other documents. For example, if similar information has been previously extracted from another instance of the document, then this previously extracted information can be used during the analysis to identify and/or to correct an error (s). Thus, if the document is a paycheck, the employer name, which was extracted from a previous paycheck, may be used to correct an error that occurred during extraction of the employer name from the current paycheck.

In some embodiments, the electronic device optionally erases the one or more images after performing the analysis (operation 124).

In some embodiments of method 100, there may be additional or fewer operations. Moreover, the order of the operations may be changed, and/or two or more operations may be combined into a single operation.

By capturing and using multiple images to extract the information proximate to the target location on the document, the information-extraction technique can improve the accuracy of the extracted information by 50%, and can reduce the time needed to complete the process by 67%. In particular, the information-extraction technique may result in a more-regular angular sampling of the images (such as 46 images acquired at a fare rate of 15-20 frames/s over the approximately 2.3 seconds that it may take a user to rotate a cellular telephone from landscape to portrait orientation) than an approach that depends on arbitrary movements of the cellular telephone. Therefore, the information-extraction technique can significantly improve the user experience when using the application and the electronic device.

In an exemplary embodiment, the information-extraction technique leverages the capabilities of digital cameras and imaging sensors in cellular telephones to acquire multiple images of a target location while the orientation or angle of the digital camera is changing. These images may be acquired without user action (i.e., before the user activates or presses a physical button, a virtual icon or an image-activation mechanism associated with an imaging sensor that is normally used to take pictures). In particular, as the user is pointing the imaging sensor toward a target location on a document (such as a field in an invoice or a check) and is rotating the imaging sensor between two different orientations, multiple images may be acquired. In some embodiments, the resulting images may be presented to the user who provides feedback on the image quality. If one or more images are blurry or the desired information at the target location is absent (for example, if the information isn't included in the image), the images may be re-acquired.

Subsequently, information in at least some of the images can be extracted using optical character recognition, and the extracted information may then be used by a financial software application such as a remote-check-deposit application or income-tax software. To facilitate this analysis, the view finder or the image-capture zone associated with the imaging sensor (as specified by the application) may be adjusted when the images are acquired. For example, the view finder or the image-capture zone may be adjusted based on a size of a field associated with a given target location. This field may be predefined so that the desired information associated with the given target location is captured in the corresponding images. For example, if the given target location is an account number, the field may be a rectangular block or region that includes the account number, and the view finder or the image-capture zone may be adjusted accordingly so that the account number is included in at least some of the images. However, if the target location is an address, the view finder may display a larger square to cover the three or four lines in a typical address field. In conjunction with acquiring multiple images, this adjustment of the view finder may improve the accuracy of the extracted information and, thus, may significantly increase user satisfaction when using the application.

During operation of the application, the application executing on the electronic device may display or present the view finder on a screen or a display of the electronic device. In response to instructions from the application to acquire the first image in the first orientation and the second image in the second orientation, such as a verbal prompt or a message displayed on the screen, the user may point the imaging sensor toward a target location or an area of interest (e.g., an account number), and this area may be displayed in the view finder on the screen. After the user has activated an image-activation mechanism and has acquired the first image, and while the user is rotating the electronic device to the second orientation (i.e., before the user has activated the image-activation mechanism a second time to acquire the second image), the application and/or the electronic device may provide a signal to the imaging sensor, which then takes multiple pictures of the area of interest, each of which may have an associated timestamp and/or spatial-position information (such as spatial-position information associated with a sensor, e.g., an accelerometer and/or a gyroscope, which is integrated in the electronic device). Note that an image capture rate of the imaging sensor may be based on the spatial-position information. For example, the image capture rate may be approximately constant when the spatial-position information is varying. However, in some embodiments the image capture rate may be larger when the spatial-position information is varying, and may be smaller when the spatial-position information is approximately stable.

In some embodiments, even if ambient light is sufficient to acquire the images, the application may also activate an integrated flash or light to increase the focus and/or quality of the image. Thus, the flash may be selectively triggered by the application and/or the electronic device based on a focus level that corresponds to a focus of the imaging sensor. This may make subsequent extraction of information in the images simpler and/or more accurate.

In an exemplary embodiment, a customer (John) uses the application to pay a bill. When John receives a physical bill, he may activate the application (which is sometimes referred to as 'Flashpay') on his cellular telephone. In response to displayed instructions to acquire the first image in a portrait orientation and the second image in a landscape orientation, John may center an account number on the bill in the view finder shown on the screen of the cellular telephone and may press a physical button or a virtual icon (and, more generally, an image-activation mechanism) to capture the first image. After John does this, and while he is rotating the cellular telephone from the portrait orientation to the landscape orientation, Flashpay may instruct or signal the imaging sensor to take multiple, different pictures or to acquire multiple, different images of the region as the orientation of the cellular telephone (and, thus, the imaging sensor) changes. If John is left handed, these images may be acquired at orientations between 90° and 0° (corresponding to clockwise rotation). Alternatively, if John is right handed, these images may be acquired at orientations between 90° and 180° (corresponding to counter-clockwise rotation).

Note that an image capture or sampling rate of the imaging sensor may be based on spatial-position information. For example, the image capture rate may be approximately constant when the spatial-position information is varying (i.e., while John is rotating the cellular telephone). Alternatively, the image capture rate may be larger when the spatial-position information is varying, and may be smaller when the spatial-position information is approximately stable (thus, the frame or image-capture rate may be dynamically adjusted based on the spatial-position information). In particular, the image-capture rate may vary linearly with angular speed, from 2 frames/s at a speed of 1°/s to 15 frames/s at a speed of 7.5°/s. As noted previously, Flashpay may also enable or disable the flash based on the focus level.

After the images have been acquired and John captures the second image by pressing the physical button or the virtual icon (and, more generally, the image-activation mechanism), Flashpay may process the images using optical character recognition. For example, by combing scanned text (and, more generally, extracted information) from some or all of the images (which may leverage relative timestamps, relative differences between the spatial-position information of the images and the spatial-position information of the target location, relative distances of points of interest of the images from the target location, and/or historical data), FlashPay may predict the correct result with a high certainty.

After the information is extracted, Flashpay may show the resulting text to John. If he feels that this is not the data that was needed, John can re-point the imaging sensor at the object, which will result in another series of images being acquired. Moreover, John may repeat the aforementioned operations for other target locations on the bill, such as target locations corresponding to: the address of the biller, the bill due date, and the amount billed. Once Flashpay has processed the images, it may have all the information needed to pay the bill.

Note that in the preceding example John did not have to take a picture of the whole bill and he did not have to send the images for remote processing. Instead, by acquiring multiple images, his cellular telephone was able to perform the optical character recognition to extract the desired information.

Figure 2:
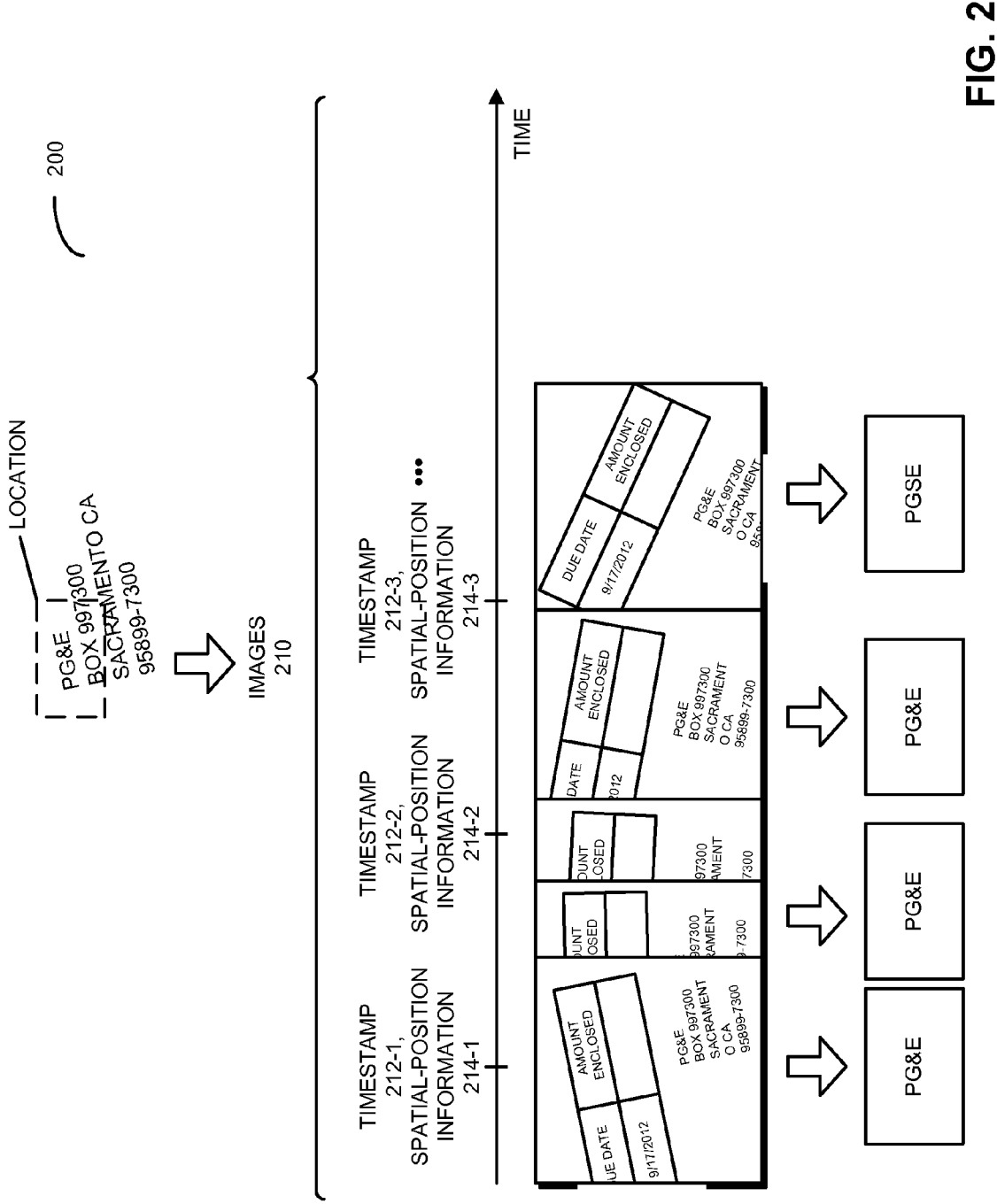
FIG. 2 is a drawing illustrating the method of FIG. 1 using multiple images of a document in accordance with an embodiment of the present disclosure.

We now describe extraction of the information using the acquired images in more detail. FIG. 2 is a drawing 200 illustrating method 100 (FIG. 1) using multiple images 210 of a document. After the user is instructed to point the imaging sensor at the target location and has acquired the first image (but still hasn't acquired the second image), the imaging sensor may acquire images. The image capture rate may be approximately constant between the times when the first image is acquired and the second image is acquired. However, in some embodiments the image capture rate may be highest for timestamps and/or spatial-position information closest to timestamps and/or spatial-position information for the first image and/or the second image. Moreover, the image capture rate may be lower for timestamps and/or spatial-position information farthest from the timestamps and/or spatial-position information for the first image and/or the second image. For example, the image capture rate may be lower for an orientation of 45°, which is mid-way between the portrait orientation and the landscape orientation. Alternatively or additionally, the image capture rate may be higher when the spatial position and/or focus of the electronic device are approximately stable, for example, when the user is acquiring the first image and the second image. Note that each of images 210 may have an associated one of timestamps 212 and/or spatial-position information 214 (such as a linear position from an accelerometer and/or an angular position from a gyroscope).

When the user activates the image-activation mechanism and captures the first image and/or the second image, one or more reference timestamps and/or reference spatial-position information for the target location may be stored. Using this reference information, an extraction module in the electronic device (such as an optical character recognition engine or module) may extract information from at least some of acquired images 210 (which are taken at different angles in a plane) using optical character recognition. In this process, timestamps 212 and/or spatial-position information 214 associated with images 210 relative to the one or more reference timestamps and/or the reference spatial-position information may be used to determine which of images 210 are likely to be the best source of the extracted information (i.e., which can accurately provide the extracted information).

For example, if the extracted information from a given image is different than the extracted information from other images, an error may be predicted and the extracted information from temporally and/or spatially adjacent images to the given image (or to the reference timestamp and/or the reference spatial-position information) may be used to determine the correct result. In particular, images having associated timestamps within a time interval of the reference timestamp of the first image or the second image (such as within approximately 0.5 s) may be used. (Thus, images at preceding times and/or subsequent times may be used.) Furthermore, images near the target location (i.e., images having similar spatial-position information to the reference spatial-position information of the first image or the second image) may have larger weights (and, thus, larger contributions) in the analysis. Thus, if the target location is at an angle of 56°, the corresponding weight in the analysis may be 1 at 56° and may decrease linearly to 0.1 at 100° or 12°. Alternatively, images within 45° of the reference spatial-position information for the first image or the second image may be used to correct errors in the first image or the second image, respectively.

In addition, historical data may be used to determine if there was a match previously (i.e., if the correct information was extracted previously or is known). If yes, the previous match may be used to identify and/or correct an error in the extracted information.

As shown in FIG. 2, if the information at the target location is "PG&E" and the optical character recognition result from one image is "PGSE" and from other adjacent images is "PG&E," there is a high probability that the correct result is "PG&E." This result can also be validated against stored historical data. However, if this result was extracted for the first time, then it may be added to the historical data for future reference. In this way, the information extraction technique may facilitate the building of a data structure that, over time, can be used to improve the accuracy of extracted information.

Therefore, by using the extracted information from multiple images, the accuracy of the extracted information can be improved. In particular, the information-extraction technique can detect optical character recognition or human errors and make corrections. For example, a '5' may have been incorrectly extracted as an 'S,' an '8,' or a 'B.' However, by using multiple images and/or historical information, this error may be identified and corrected.

Note that even though multiple images 210 may be acquired, the user may think that only two images have been acquired because the user only pressed the image-activation mechanism twice (for a given target location). Therefore, the improved performance offered by the information-extraction technique may be surprising to the user, which may delight the user and increase their satisfaction.

FIG. 3 presents a block diagram illustrating an electronic device 300 that performs method 100 (FIG. 1). Electronic device 300 includes one or more processing units or processors 310, a communication interface 312, a user interface 314, and one or more signal lines 322 coupling these components together. Note that the one or more processors 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in electronic device 300 may include volatile memory and/or non-volatile memory. More specifically, memory 324 may include: ROM, RAM, EPROM, EEPROM, flash memory, one or more smart cards, one or more magnetic disc storage devices, and/or one or more optical storage devices. Memory 324 may store an operating system 326 that includes procedures (or a set of instructions) for handling various basic system services for performing hardware-dependent tasks. Memory 324 may also store procedures (or a set of instructions) in a communication module 328. These communication procedures may be used for communicating with one or more computers and/or servers, including computers and/or servers that are remotely located with respect to electronic device 300.

Memory 324 may also include multiple program modules (or sets of instructions), including: financial application 330 (or a set of instructions), image-acquisition module 332 (or a set of instructions), extraction module 334 (or a set of instructions), and/or encryption module 336 (or a set of instructions). Note that one or more of these program modules (or sets of instructions) may constitute a computer-program mechanism.

During method 100 (FIG. 1), financial application 330 (and, more generally, an arbitrary software application) may be launched based on a user command. For example, the user may launch financial application 330 by clicking on a physical button in keyboard 318 or a virtual icon associated with financial application 330 that is displayed on display 316.

Then, financial application 330 provides information 338 (such as an instruction) to the user to point an imaging sensor 308, which is integrated into electronic device 300, to one of target locations 340 on a document 342, and to have the user acquire a first image 344 and a second image 346 in corresponding orientations 348 using imaging sensor 308. For example, financial application 330 may present information on display 316.

After the user has acquired first image 344 (by activating an image-activation mechanism that triggers image capture by imaging sensor 308) and before the user has acquired second image 346, image-acquisition module 332 may communicate a signal to imaging sensor 308 to acquire images 350. Each of the images 350 may have an associated one of timestamps 352 and/or spatial-position information 354 (which may be provided by spatial sensor 306, e.g., an accelerometer and/or a gyroscope integrated in electronic device 300). Note that these images may be acquired without explicit action by the user, such as without the user activating an image-activation mechanism associated with imaging sensor 308. Then, image-acquisition module 332 may store images 350, timestamps 352 and/or spatial-position information 354 in memory 324.

Note that when an imaging sensor 308 is pointed at the one of target locations 340, and the user activates the image-activation mechanism associated with imaging sensor 308 and acquires first image 344 and/or second image 346, image-acquisition module 332 may store reference information 356 (such as one or more reference timestamps and/or reference spatial-position information).

After the user has acquired second image 346 (by activating the image-activation mechanism), extraction module 334 may analyze at least some of first image 344, second image 346 and images 350 to extract information 358 proximate to the one of target locations 340 on document 342. For example, extracted information 358 may be extracted using optical character recognition. Note that the contributions of first image 344, second image 346 and images 350 during the analysis may be specified by weights 360 associated with first image 344, second image 346 and images 350. These weights may be based on spatial and/or temporal distance between a given image in first image 344, second image 346 and images 350 and the one of target locations 340 (for example, as specified by reference information 356). Alternatively, weights 360 may be based on differences between information 358 extracted from the given image and the other images.

In some embodiments, the analysis is based on historical information 362 previously extracted from one or more other documents 364. For example, if similar information has been previously extracted from another instance of the document, then this previously extracted information can be used during the analysis.

Figure 4:
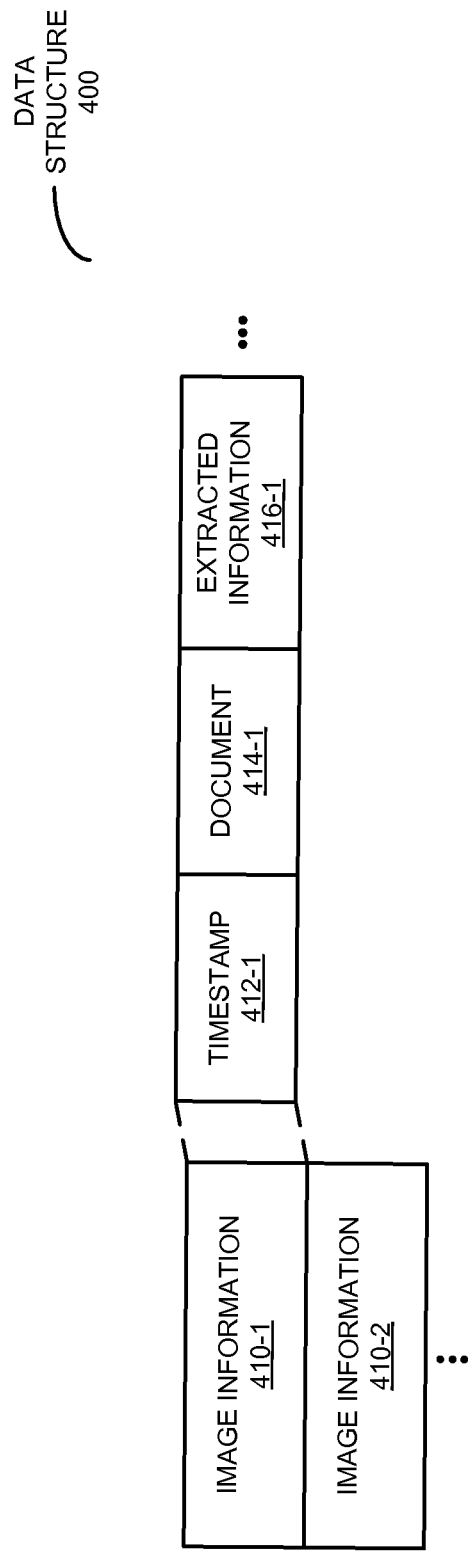
FIG. 4 is a block diagram illustrating a data structure for use with the electronic device of FIG. 3 in accordance with an embodiment of the present disclosure.

The history information, as well as information about the document, the images, the points of interest and/or the exposure settings, may be included in a data structure. This is shown in FIG. 4, which presents a data structure 400 that includes image information 410 associated with the information-extraction technique. In particular, image information 410-1 includes: a timestamp 412-1, a document 414-1, and/or extracted information 416-1.

Referring back to FIG. 3, after information 358 is extracted, extraction module 334 may optionally erase first image 344, second image 346, images 350, timestamps 352, spatial-position information 354 and/or reference information 356. Additionally, extracted information 358 may subsequently be used by financial application 330. For example, financial application 330 may use extracted information 358 to perform a financial calculation and/or to complete a financial form (such as an income-tax return).

Because information in electronic device 300 may be sensitive in nature, in some embodiments at least some of the data stored in memory 324 and/or at least some of the data communicated using communication module 328 is encrypted using encryption module 336.

Instructions in the various modules in memory 324 may be implemented in: a high-level procedural language, an object-oriented programming language, and/or in an assembly or machine language. Note that the programming language may be compiled or interpreted, e.g., configurable or configured, to be executed by the one or more processors 310.

Although electronic device 300 is illustrated as having a number of discrete items, FIG. 3 is intended to be a functional description of the various features that may be present in electronic device 300 rather than a structural schematic of the embodiments described herein. In practice, and as recognized by those of ordinary skill in the art, the functions of electronic device 300 may be distributed over a large number of servers or computers, with various groups of the servers or computers performing particular subsets of the functions. In some embodiments, some or all of the functionality of electronic device 300 may be implemented in one or more application-specific integrated circuits (ASICs) and/or one or more digital signal processors (DSPs).

Electronic device 300 may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a digital camera, a server and/or a client computer (in a client-server architecture). Moreover, electronic device 300 may be capable of communication via a network, such as: the Internet, World Wide Web (WWW), an intranet, a cellular-telephone network, LAN, WAN, MAN, or a combination of networks, or other technology enabling communication between computing systems.

In some embodiments one or more of the modules in memory 324 (such as image-acquisition module 332) may be associated with and/or included in financial application 330. This financial application may include: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, financial application 330 may include: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

Electronic device 300 may include fewer components or additional components. Moreover, two or more components may be combined into a single component, and/or a position of one or more components may be changed. In some embodiments, the functionality of electronic device 300 may be implemented more in hardware and less in software, or less in hardware and more in software, as is known in the art.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic-device-implemented method for extracting information from a document, comprising:
providing instructions to a user to acquire a first image of a target location on the document using an imaging device, which is integrated into the electronic device, when the imaging device is in a first orientation, and to acquire a second image of the target location using the imaging device when the imaging device is in a second orientation;
after a first instance in which the user activates an image-activation mechanism, which is associated with the imaging device, and captures the first image, and before a second instance in which the user activates the image-activation mechanism and captures the second image, capturing a third set of multiple images of the document;
storing the first image, the second image, and the third set of images with associated timestamps;
receiving a signal indicating the second instance of the user activating the image-activation mechanism; and
in response to the signal, analyzing one or more of the first image, the second image and at least a subset of the third set of multiple images to extract the information near the target location on the document.

2. The method of claim 1, wherein the first image, the second image, and the third set of images are further stored with spatial-position information, which is provided by a sensor which is integrated into the electronic device.

3. The method of claim 2, wherein the sensor includes one of: an accelerometer and a gyroscope.

4. The method of claim 2, wherein the first image, the second image, and the third set of images are captured at an image capture rate that is based on the spatial-position information.

5. The method of claim 2, wherein the spatial-position information includes position information and orientation information.

6. The method of claim 1, wherein the method further comprises identifying an error in the analysis based on a predefined information format associated with the target location on the document.

7. The method of claim 6, wherein the method further includes performing error correction of the identified error based on at least the subset of the images;
wherein a contribution of a given image in the images during the error correction is based on a corresponding weight; and
wherein the weight is based on at least one of a difference between: a timestamp associated with the given image and a reference timestamp; and spatial-position information associated with the given image and reference spatial-position information.

8. The method of claim 1, wherein the multiple images are captured without the user activating the image-activation mechanism.

9. The method of claim 1, wherein the analysis includes optical character recognition.

10. The method of claim 1, wherein the method further comprises erasing the one or more images after performing the analysis.

11. The method of claim 1, wherein an angular difference between the first orientation and the second orientation is approximately 90°.

12. A computer-program product for use in conjunction with an electronic device, the computer-program product comprising a non-transitory computer-readable storage medium and a computer-program mechanism embedded therein, to facilitate extraction of information from a document, the computer-program mechanism including:
instructions for providing instructions to a user to acquire a first image of a target location on the document using an imaging device, which is integrated into the electronic device, when the imaging device is in a first orientation, and to acquire a second image of the target location using the imaging device when the imaging device is in a second orientation;

instructions for determining that a first instance in which the user activates an image-activation mechanism, which is associated with the imaging device, and captures the first image has occurred, and a second instance in which the user activates the image-activation mechanism and captures the second image has not occurred;

after the first instance and before the second instance, instructions for capturing a third set of multiple images of the document;

instructions for storing the first image, the second image, and the third set of multiple images with associated timestamps;

instructions for receiving a signal indicating the second instance of the user activating the image-activation mechanism; and in response to the signal, instructions for analyzing one or more of the first image, the second image and at least a subset of the third set of multiple images to extract the information near the target location on the document.

13. The computer-program product of claim 12, wherein the first image, the second image, and the third set of multiple images are further stored with spatial-position information, which is provided by a sensor which is integrated into the electronic device.

14. The computer-program product of claim 13, wherein the sensor includes one of: an accelerometer and a gyroscope.

15. The computer-program product of claim 13, wherein the first image, the second image, and the third set of multiple images are captured at an image capture rate that is based on the spatial-position information.

16. The computer-program product of claim 13, wherein the spatial-position information includes position information and orientation information.

17. The computer-program product of claim 12, wherein the computer-program mechanism further includes instructions for identifying an error in the analysis based on a predefined information format associated with the target location on the document.

18. The computer-program product of claim 17, wherein the computer-program mechanism further includes instructions for performing error correction of the identified error based on at least the subset of the images;
   wherein a contribution of a given image in the images during the error correction is based on a corresponding weight; and
   wherein the weight is based on at least one of a difference between: a timestamp associated with the given image and a reference timestamp; and spatial-position information associated with the given image and reference spatial-position information.

19. The computer-program product of claim 12, wherein the multiple images are captured without the user activating the image-activation mechanism.

20. The computer-program product of claim 12, wherein the analysis includes optical character recognition.

21. The computer-program product of claim 12, wherein the computer-program mechanism further includes instructions for erasing the one or more images after performing the analysis.

22. The computer-program product of claim 12, wherein an angular difference between the first orientation and the second orientation is approximately 90°.

23. An electronic device, comprising:
   a processor;
   memory; and
   a program module, wherein the program module is stored in the memory and configurable to be executed by the processor to facilitate extracting information from a document, the program module including:
      instructions for providing instructions to a user to acquire a first image of a target location on the document using an imaging device, which is integrated into the electronic device, when the imaging device is in a first orientation, and to acquire a second image of the target location using the imaging device when the imaging device is in a second orientation;
      instructions for determining that a first instance in which the user activates an image-activation mechanism, which is associated with the imaging device, and captures the first image has occurred, and a second instance in which the user activates the image-activation mechanism and captures the second image has not occurred;
      after the first instance and before the second instance, instructions for capturing a third set of multiple images of the document;
      instructions for storing the first image, the second image, and the third set of multiple images with associated timestamps;
      instructions for receiving a signal indicating the second instance of the user activating the image-activation mechanism; and
      in response to the signal, instructions for analyzing one or more of the first image, the second image and at least a subset of the third set of multiple images to extract the information near the target location on the document.

* * * * *